No. 775,796. Patented November 22, 1904.

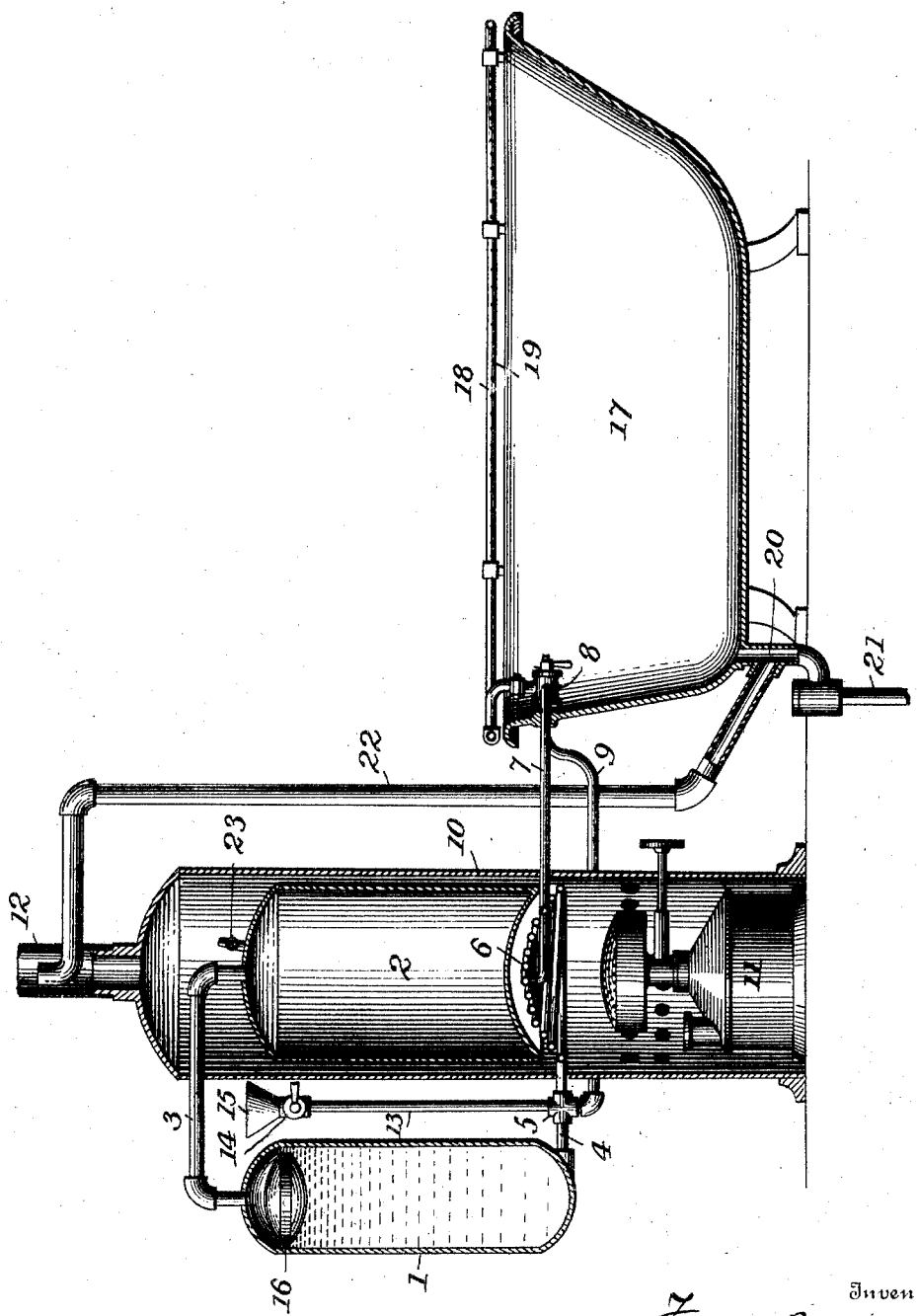

UNITED STATES PATENT OFFICE.

FRANZ BURGER AND HENRY M. WILLIAMS, OF FORT WAYNE, INDIANA; SAID BURGER ASSIGNOR OF ONE-HALF OF HIS RIGHT TO SAID WILLIAMS.

SPRAY-BATH.

SPECIFICATION forming part of Letters Patent No. 775,796, dated November 22, 1904.

Application filed February 7, 1902. Serial No. 93,009. (No model.)

*To all whom it may concern:*

Be it known that we, FRANZ BURGER and HENRY M. WILLIAMS, citizens of the United States, residing at Fort Wayne, Allen county, State of Indiana, have invented certain new and useful Improvements in Spray-Baths, of which the following is a specification.

Our invention relates to means for supplying water to bath-tubs and the like whereby a spray-bath of either hot or cold water or combined hot and cold water may be furnished in places where water under pressure is not readily obtainable; and to these ends our invention consists in apparatus constructed and arranged substantially as hereinafter more particularly pointed out.

In the accompanying drawing we have shown a sectional view of apparatus embodying our invention connected to a bath-tub.

The apparatus embodies a tank or reservoir 1, which may be of any desired size and which, as shown, is connected to an air-chamber 2 by means of a pipe 3, extending between the upper portions of the reservoir and chamber.

Leading from the reservoir is a pipe 4, to which is connected a cross-piece 5, and from this cross-piece extends a pipe bent in the form of a coil 6 and delivering by the end 7 into a suitable mixer or valve device 8. Also extending from the cross-piece 5 is a pipe 9, which is also connected to the mixer or valve 8.

The air-chamber 2 is mounted within a casing 10 and supplied with a suitable heat-generator, as a lamp or stove 11, and the casing has an opening 12 for the products of combustion.

In order to fill the reservoir, any suitable means may be used; but we have shown connected to the cross-piece 5 a pipe 13, having a cock 14 and preferably provided with a funnel 15, and this pipe extends upward to a height at least equal to the height of the water-reservoir 1. The reservoir is preferably provided with a float 16 of substantially the size of the reservoir, the purpose of which will appear hereinafter.

The mixer or valve 8 may be of any suitable construction, and preferably one adapted to deliver hot or cold or mixed hot and cold water is used, and this can be arranged to deliver into the tub 17; but usually it is intended to deliver to some spraying or shower apparatus, and in the present instance it is shown connected to such a device comprising a pipe or pipes 18, having suitable perforations 19, and in this instance this pipe is mounted on the edge of the tub 17.

Connected to the tub is an outlet 20, leading to the drain-pipe 21, and extending from the outlet 20 is a pipe 22, the upper end of which enters the outlet 12 of the casing 10.

There may be a cock 23 connected to the air-chamber 2, whereby the chamber and reservoir may be filled with air when necessary.

When it is desired to utilize the apparatus, assuming the reservoir 1 to be empty of water and to be full of air and connected, as shown, to the air-chamber 2, the cock 14 is turned and water forced into the funnel 15, which flows down the pipe 13 to the cross-piece 5, filling the pipes 7 and 9, if they are not already full of water, and then passing through the pipe 4 to fill the reservoir 1. As the water flows into the reservoir it forces the contained air therein into the air-chamber 2, putting the same under pressure therein. If then the heater is put in operation, the products of combustion tend to heat the water in the coil 6 of the pipe 7, and also, passing upward around the air-chamber 2, the heat tends to expand the air in the chamber, putting the water in the reservoir under great pressure. The float 16 is not necessarily used, but is preferably used, as it tends to prevent the rapid condensation or cooling of the heated air by coming in contact with the water.

If now it is desired to take a spray or shower bath, the valve 8, which, as before intimated, may be of any ordinary or usual construction capable of delivering, as an ordinary three-way valve, is turned so that cold water under pressure may be delivered to the spray apparatus directly through the pipe 9, and hot water may be delivered therethrough from the water-reservoir through the heating-coil 6 and pipe 7, or a mixture of both hot and cold water may be delivered to the spray or shower apparatus.

It will be understood that the products of combustion passing through the casing 10 and the outlet 12 tend to increase the draft through the pipe 22 and aid in preventing sewer-gas entering the tub or room.

It will thus be seen that we provide a simple, cheap, and effective apparatus which may be used in connection with any bathing apparatus, as a spray or shower device or tub, and which will furnish hot or cold water under pressure, and it is specially adapted for use in places where water is not ordinarily supplied under pressure either hot or cold.

Of course if cold water is supplied under pressure it may deliver into the pipe 13 and be utilized in the manner above described.

What we claim is—

1. In an apparatus of the class described, the combination with the water-reservoir, of an air-chamber, a connection between the upper parts of the water-reservoir and the air-chamber, means for supplying the water-reservoir with water, pipes leading from the lower part of the reservoir, one of which includes a heating-coil and means for applying heat to the heating-coil and air-chamber, substantially as described.

2. In an apparatus of the class described, the combination with the water-reservoir, of an air-chamber connected thereto, a pipe provided with a cock connected to the water-reservoir for filling the same, a pipe leading from the lower portion of the reservoir and including a coil, and a heater arranged to heat the coil and air-chamber, substantially as described.

3. In an apparatus of the class described, the combination with the water-reservoir, of an air-chamber connected thereto, means for filling the reservoir with water, pipes leading from the reservoir, one of which includes a coil, a valve connected to control the flow of fluid in the pipes, a spray apparatus connected to the valve and a heater adapted to supply heat to the coil and air-chamber, substantially as described.

4. In an apparatus of the class described, the combination with the water-reservoir, of the air-chamber, connections between the two, a casing surrounding the air-chamber and having a discharge-outlet at the top, a pipe leading from the reservoir including a coil, means for supplying heat inside the casing to the coil and air-chamber, a bath-tub having a discharge-outlet and a pipe leading from said discharge-outlet to the outlet of the casing, substantially as described.

In testimony whereof we have signed our names to this specification in the presence of two subscribing witnesses.

FRANZ BURGER.
HENRY M. WILLIAMS.

Witnesses:
GEO. K. TORRENCE,
CHARLES F. FREESE.